July 19, 1938. W. R. REDHEAD 2,124,149
TANDEM WHEEL TRUCK
Filed April 22, 1936 2 Sheets—Sheet 2
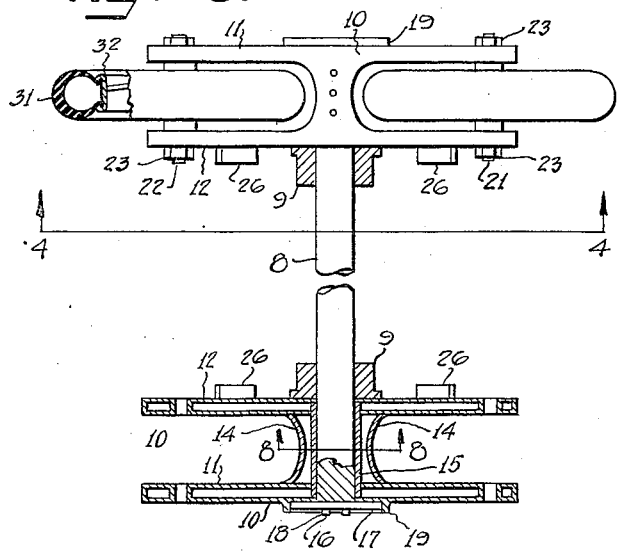
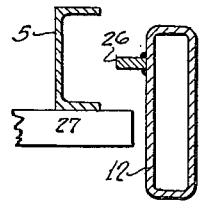
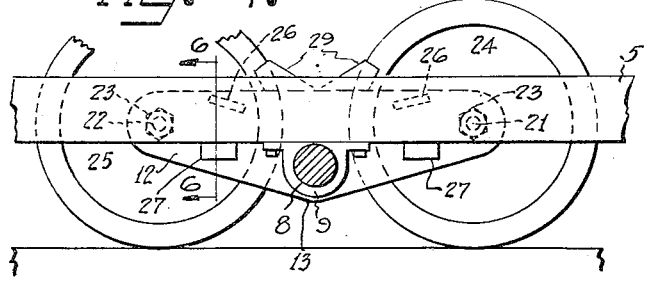
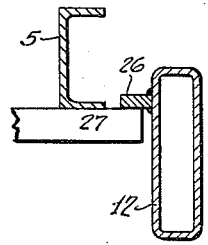
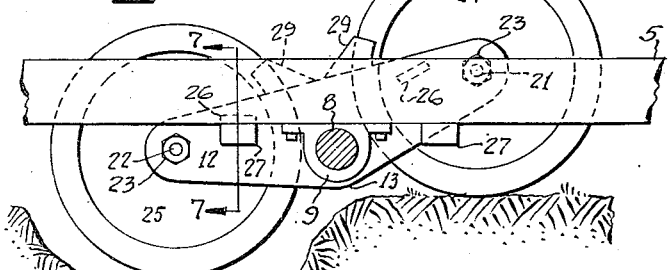
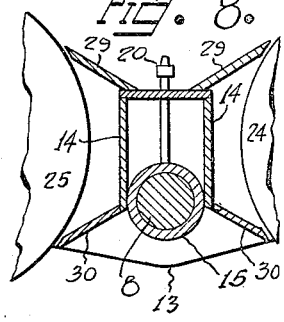
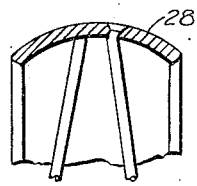
INVENTOR
WILLIAM R. REDHEAD
BY Harold L. Cook
ATTORNEY Patented July 19, 1938

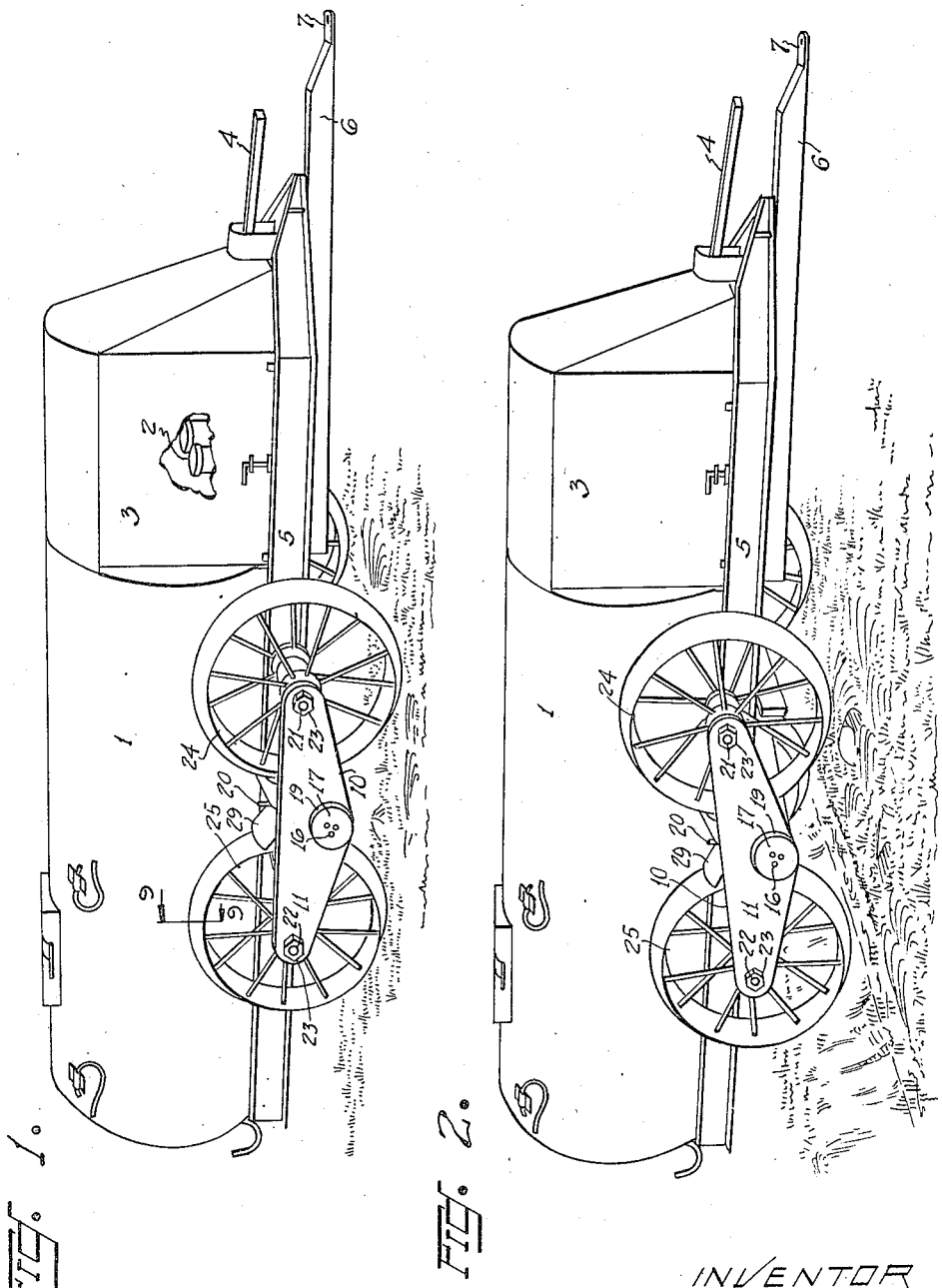

2,124,149

UNITED STATES PATENT OFFICE 2,124,149

TANDEM WHEEL TRUCK

William R. Redhead, Oswego, Oreg., assignor to
The Hardie Manufacturing Company, Hudson,
Mich., a corporation of Michigan Application April 22, 1936, Serial No. 75,717

3 Claims. (Cl. 280—80)

This invention relates to tractor trailers for mounting power take-off sprayers, and has particular reference to a novel form of truck for such trailers.

The spraying of orchards, vineyards and the like is usually done from one of three types of apparatus, namely: a stationary spray plant; a portable power sprayer; or a tractor-trailer sprayer. The last named sprayer comprises a spray tank and a pump to deliver the spray material therefrom, the tank and pump being mounted upon a truck adapted to be coupled to a tractor as a trailer, power to operate the pump being supplied from the tractor engine by means of a power take-off connection.

Heretofore these trucks have been mounted upon an axle positioned intermediate the length of the truck and carried upon wheels which measure from 40 to 54 inches in diameter. Such wheels were designed to carry the apparatus over wet and uneven ground, it being intended that the wheel might bridge the relatively narrow and deep irrigation ditches, which are disposed between the rows of trees in a large number of orchards, to prevent the truck from dropping therein to any appreciable extent. Moreover, the large wheels provide rolling traction for the truck in mud or soft earth where smaller wheels would be insufficient to provide support for the vehicle. Even when equipped with large wheels, however, the capacity of the spray tank on such trucks has been limited to approximately 400 gallons, due to the fact that the weight of larger loads pushes the truck so deeply into mud and soft earth as to cause it to become unmanageable.

A more recent development in tractor-trailer sprayers is a trailer mounted on crawler tracks, such trailers being capable of carrying as much as 800 gallons of spray material because of the increased load supporting area of the endless track. However, such construction is not suited for executing short turns such as required in maneuvering the sprayer between rows of trees and vines, the truck being subjected to severe tortional strains by reason of the resistance offered by the track units to change in the direction of travel of the trailer. Moreover, the use of crawler tracks necessitates a frame construction including reinforcing braces, trusses and the like to withstand such tortional strains.

The present invention is directed to a novel construction of trucks for tractor-trailer sprayers which embodies the weight carrying qualities of the crawler tracks, and which is easily maneuvered over wet and uneven ground. A feature of the invention is a pair of wheel trucks rotatably mounting the axle, each of said trucks being carried upon a pair of wheels positioned one behind the other as in a tandem arrangement, the weight of the load being distributed equally to all four wheels. The rotatable mounting of the wheel trucks permits them to adapt themselves to varying contours of the ground surface independently of each other without subjecting the body of the trailer to tortional strains.

It is an object of the invention to provide a truck for a tractor trailer sprayer which is simple and inexpensive to construct, and which is dependable, efficient and well adapted to carry heavy loads.

A further object is to provide a truck for a tractor trailer sprayer which is easily maneuvered in close quarters and over wet or uneven ground.

A further object of the invention is to provide a truck for trailers of the character described having a maximum supporting area and load distribution, and which is easily maneuverable under heavy load conditions and under conditions which usually prevail in orchards and vineyards.

With these and other objects in mind, the invention resides in the novel construction and combination of parts hereinafter described, illustrated in the accompanying drawings and set forth in the appended claims; it being understood that various changes in form, proportion, size and details of construction within the scope of the claims may be resorted to without departing from the spirit or sacrificing any of the advantages of the invention.

In the drawings:

Figure 1 is a perspective view of a tractor trailer sprayer embodying the present invention.

Figure 2 is a perspective view similar to Figure 1 illustrating the manner in which the apparatus rides over irrigation ditches and the like.

Figure 3 is a plan view, partly in section, of the truck for a tractor trailer sprayer.

Figure 4 is a side elevation, taken on the line 4—4 of Figure 3, illustrating the wheels in the position shown in Figure 1.

Figure 5 is a side elevation of one of the wheel trucks, similar to Figure 4, illustrating the manner in which the wheels are alternately carried over ditches and similar depressions.

Figure 6 is a transverse sectional elevation taken on the line 6—6 of Figure 4.

Figure 7 is a transverse sectional elevation taken on the line 7—7 of Figure 5.

Figure 8 is a longitudinal sectional elevation taken on the line 8—8 of Figure 3.

Figure 9 is a transverse sectional elevation taken on the line 9—9 of Figure 1, illustrating a cross section of the wheel tire.

The drawings illustrate a tractor trailer sprayer comprising a spray tank 1 and a spray pump 2, the latter being covered by a dustproof housing 3. The pump is supplied with power from the tractor engine (not shown) by means of a power take-off connecting rod 4. The sprayer is mounted upon a frame including a pair of spaced, longitudinal side members 5—5 and suitable cross members (not shown) terminally welded thereto. A draw bar 6 projects forwardly of the frame and terminates in a link 7 whereby the trailer may be coupled to a tractor.

The frame of the trailer is carried upon a transverse axle 8 which is affixed thereto by spaced pillow blocks 9—9. The opposite ends of the axle 8 extend beyond the sides of the frame, and rotatably journaled upon each end of the axle is a wheel truck generally indicated at 10. Inasmuch as the construction of each wheel truck is identical with the other, it will suffice to describe but one of them in detail.

Each wheel truck comprises two horizontally spaced, longitudinal side members 11 and 12, each of which is made in the shape of an oblique-angled triangle having a dependent vertex as at 13. The side members 11 and 12 are interconnected by transversely curved truss plates 14 disposed midway between the ends of the side members, which plates 14 form the top and side walls of a box-like structure enclosing a tube-like bearing 15 extending transversely of each wheel truck 10 at the lowest point thereof and by means of which the wheel truck is rotatably journaled upon the end portion of the axle 8. As shown, each end of the axle 8 is equipped with stud bolts 16 which constitute extensions thereof. A plate or disc 17 is adapted to be placed over each end of the axle, the stud bolts 16 projecting therethrough, the plate being secured to said axle by means of nuts 18 which threadedly engage said stud bolts. The plate 17 is of such size as to overlie a portion of the side member 11 to retain the wheel trucks 10 in proper position longitudinally of the axle. An upstanding wall 19 is disposed annularly of said plate 17 to protect the bearing from foreign matter which might otherwise enter under the edges of said plate. The bearing 15 is lubricated by means of a fitting 20 which communicates therewith and which may be made accessible at any desired point. Each end of the side members 11 and 12 are uniformly recessed to receive stub axles 21 and 22, these stub axles projecting through each of the side members 11 and 12 and being engageable by nuts 23. Mounted upon the stub axles 21 and 22 are wheels 24 and 25, the wheels in each wheel truck being positioned one behind the other as in a tandem arrangement. By means of the construction just described, the respective wheel trucks 10 are independently rotatable about the axle 8, and, due to the particular arrangement of the wheels 24 and 25, irregularities in the surface of the ground are not communicated to any appreciable extent to the sprayer.

As best illustrated in Figure 9, the wheel tires 28 are convex in cross section, the curvature transversely of the tire being approximately the same as the longitudinal curvature of the wheel.

It will be appreciated that mounting ordinary flat tread wheels in tandem arrangement on vehicles of the character described is not good construction, because of the excessive amount of power required to turn a vehicle so equipped in a short radius. In such construction the flat wheels tend to cut into the mud and soft earth, and the shorter the vehicle is turned, the more completely such wheels bury themselves. Moreover, the tortional strains to which such a vehicle would be subjected during turning would cause material damage to the spray tank. On the other hand, tandem wheels having convex treads tend to climb out of the mud in executing a turn, and the wheels ride the surface of the ground rather than cutting into it. Mud scrapers 29 and 30, which conform to the transverse contour of the wheels, are affixed to the structure intermediate the wheels for an obvious purpose.

In Figure 3 the wheels are illustrated as being equipped with pneumatic tires 31 which are mounted upon rims 32. The use of pneumatic tires in this construction is made possible by the fact that such tires are convex in cross section, and that wheels so equipped operate in a manner similar to wheels having convex tires, as illustrated in Figure 9. Whenever the wheel truck assembly is equipped with pneumatic tires, the mud scrapers 29 and 30 may be eliminated, since these tires flex sufficiently as they roll to cause the dirt to drop therefrom.

A pair of stops 26—26 are affixed to the inner face of each wheel truck 10, the respective stops being welded to the face of the side members 12—12 adjacent the ends thereof in such manner that the lower edge of each stop 26 parallels the respective lower edge of the side member to which it is affixed. A pair of spaced bars 27—27 are disposed transversely of the frame of the trailer, the opposite ends of each bar projecting beyond the side members 5—5 of the frame a sufficient distance to be engageable by transversely aligned stops 26—26. The stops 26 are designed to engage said bars 27 whenever the varying contour of the ground causes the wheel truck to rotate upon the axle 8 a predetermined amount, the function of this construction being to limit the rotation of the wheel truck for a purpose presently to be described.

As best seen in Figures 2 and 5, whenever the sprayer is drawn over relatively narrow irrigation ditches and the like, the forward wheels 24 are prevented from dropping into the depression by the aligned stops 26 on the forward ends of the wheel trucks. These stops engage the opposite ends of the front bar 27 and serve to carry the front wheels over the depression. When the front wheels again contact the ground after having passed over the ditch, these wheels assume the burden of the load while the rear wheels 25 are being carried over the depression by the rear stops. Figure 6 illustrates the relative positions of the stops 26 and bars 27 when the trailer is being drawn over comparatively even ground, as indicated in Figures 1 and 4; and Figure 7 illustrates the manner in which these parts coact to carry the adjacent wheels over irrigation ditches and similar depressions, as indicated in Figures 2 and 5. The axle 8, which forms the support for the frame and the spray tank, is journaled in the lowermost portion of the wheel trucks, and thus exerts a downward pull upon the axis of the tandem wheels, which pull is transferred to one of the stop members 26 whenever the adjacent wheel is out of engagement with the ground.

Thus, while one of the tandem wheels must temporarily do the work of both, the weight of the load is distributed over the length of the wheel truck similarly as when both wheels are in contact with the ground. In consequence of this construction, the shocks resulting from traveling over uneven ground are completely taken up by the wheel trucks, there being no appreciable jolting or jarring of the sprayer. As is well known in the industry, these sprayers are very often equipped with spray towers mounted on top of the spray tank, operators being positioned in these towers to direct the spray into the tops of trees. It will be appreciated that any rolling or jolting of the trailer would be very disconcerting, and even dangerous to operators in a spray tower. By use of a construction embodying the present invention the sprayers are maneuverable over uneven ground without any noticeable swaying or jolting of the spray towers.

It is believed to be apparent from the foregoing description that a construction has been provided in which has been achieved the several objects noted, together with many thoroughly practical advantages. It may be stated, however, that although the particular embodiment of the invention hereinabove described is primarily designed for tractor trailer sprayers, its application is not necessarily confined thereto, but may be used either in its entirety or in part, and either with or without modifications, on other types of trailers as well without departing from the spirit of the invention, and I deem myself entitled to all such uses, modifications and/or variations as fall within the spirit and scope of the claims hereto appended.

Having now described my invention and in what manner the same may be used, what I claim as new and desire to protect by Letters Patent is:

1. In a trailer of the character described, a frame, an axle disposed transversely of said frame, a wheel truck mounted on each end of said axle, each wheel truck comprising a pair of spaced side walls, a pair of ground engaging wheels disposed between and journaled in the ends of said side walls in tandem arrangement, each of said wheel trucks being disposed for rotation about said axle to provide an oscillatory mounting for said axle, a stop bar projecting laterally from each side of said frame adjacent each end of the said wheel trucks, and a stop member mounted on each end of each of said wheel trucks for engaging said bar, said stop member and said bar cooperating to carry the burden normally carried by the adjacent wheel whenever but one of said wheels shall be in engagement with the ground.

2. In a trailer of the character described, a frame, an axle disposed transversely of said frame, a wheel truck mounted on each end of said axle, each wheel truck rotatably engaging said axle, a pair of ground engaging wheels mounted upon each said wheel truck in tandem arrangement, the weight of the load on the frame being distributed equally to both ends of the wheel truck, a frame engaging member affixed to each said wheel truck adjacent the axis of rotation of each said wheel for maintaining an equal distribution of the load to both ends of the wheel truck whenever but one of said wheels shall be in engagement with the ground.

3. In a vehicle having a frame and an axle extending transversely of said frame, a wheel truck rotatably engaging said axle, said wheel truck including ground engaging wheels mounted to either side of said axle in tandem relation, means carried by said wheel truck adapted to engage a fixed portion on the vehicle to limit rotation of said wheel truck about said axle and so constructed and arranged that an equal distribution of the load is maintained at both ends of said wheel truck whenever but one of said wheels is in engagement with the ground.

WILLIAM R. REDHEAD.